UNITED STATES PATENT OFFICE.

FRANCIS COOK SIMSON, OF HALIFAX, NOVA SCOTIA, CANADA.

ILLUMINATING COMPOSITION.

966,251.  Specification of Letters Patent.  Patented Aug. 2, 1910.

No Drawing.  Application filed September 4, 1909.  Serial No. 516,307.

*To all whom it may concern:*

Be it known that I, FRANCIS COOK SIMSON, a subject of the King of Great Britain, and a resident of Halifax, in the Province of Nova Scotia, Dominion of Canada, have invented a new and Improved Illuminating Composition, of which the following is a full, clear, and exact description.

My invention relates to illuminating compositions, that is, to compositions which are self-luminous in the dark, my more particular purpose being to provide a composition of this type offering superior advantages regarding the degree of light emitted and having suitable form to be used in a variety of relations where the use of illuminating compositions is ordinarily difficult or impossible.

My improved compositions is, under ordinary conditions of temperature, solid, but under temperatures somewhat higher than ordinary temperatures of the atmosphere, but considerably lower than the boiling point of water, it becomes a paste, and at a still higher temperature, a liquid. This increases its usefulness for the reason that by applying a gentle heat, the composition can be readily molded or forced into different forms. At ordinary temperatures it may be reduced to powder and will retain its powdery form. Owing to this fact it may be used singly or by mixing various ingredients with it. In the form of powder or in the form of a plastic material, it is suitable for filling into any hollow transparent body. It may also be made up in the form of a mastic having more or less resiliency and having sufficient adhesiveness to cause it to cling to a surface of glass, porcelain, or other polished surface.

Some parts of the composition are essential and others are not essential except for certain purposes. The ingredients used and their proportions by weight are as follows: paraffin wax, 1000 parts; calcium sulfid, 1000 parts; barium sulfid, 100 parts; phosphorus, 1 part, more or less, as desired; sulfate of lime, 20 parts, more or less, as desired; liquid rubber, 100 parts, more or less, as desired. A small quantity of silicate of soda, the amount being variable within wide limits, may be added to protect the composition from the weather. The phosphorus, sulfate of lime, and liquid rubber are not for all purposes essential. The purpose of the phosphorus is to aid in the illumination and also to take up any oxygen which may accidentally be present in the composition, thereby protecting the other substances from undue oxidation. The purpose of the sulfate of lime is to harden the composition. The liquid rubber is for the purpose of rendering the composition adhesive. The various binders just mentioned may be used separately.

I have found that by the use of the liquid rubber, as above stated, the entire composition can be made to adhere directly to a polished or glass surface, or to a surface of porcelain. This adhesiveness is of considerable value as it enables the composition to be formed into letters, symbols, and the like, and also enables the composition to be distributed in any desired shape upon a surface to which ordinarily the application of an illuminating composition is very difficult. The paraffin wax serves as a carrier for the other ingredients and confers plasticity upon the composition. Its chief purpose, however, is to prevent oxidation of the other ingredients. In doing this it prolongs the light-giving power of the composition.

The composite substance above described possesses a remarkable degree of illuminating power. When exposed to a gentle light, as, for instance, when freely exposed in an ordinary room with the windows open, but with direct sunlight excluded, the composition absorbs light or some other form of energy closely associated with light or with radiant heat, and afterward gives off a beautiful glow which is very agreeable to the eye and light to attract attention in the darkness.

I have found upon actual trial that the composition above described has sufficient illuminating power to be located readily in the dark by its own glow, and also that when used in the form of a powder and filled into any transparent vessel or behind any solid transparent substance, the glow is not reduced in the least. I have found also that a fibrous substance, such as a fabric of cotton, linen, hemp, or paper, if saturated or coated with the composition, exhibits the glow almost as perfectly as if a thick block of the composition alone were employed.

While I prefer to use paraffin wax as a carrier, I find that vaseline and various other petroleum products will answer the same purpose. I also find that refined petroleum and the various petroleum products make better carriers than some other substances, for the reason that materials allied to petroleum appear to have less deleterious effect upon the illuminating power of the composition.

Having thus described my invention, I claim as new and desire to secure by Letters Patent:

The illuminating composition herein described, containing the following ingredients in the proportions by weight stated: paraffin wax 1000 parts, calcium sulfid 1000 parts, barium sulfid 100 parts, and a small proportion of silicate of soda.

In testimony whereof I have signed my name to this specification in the presence of two subscribing witnesses.

FRANCIS COOK SIMSON.

Witnesses:
 WALTON HARRISON,
 JAS. ANDERSON.